(12) United States Patent
Wang

(10) Patent No.: US 6,840,637 B2
(45) Date of Patent: Jan. 11, 2005

(54) EXTERIOR REARVIEW MIRROR SYSTEM

(75) Inventor: Jenne-Tai Wang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 44 days.

(21) Appl. No.: 10/315,771

(22) Filed: Dec. 9, 2002

(65) Prior Publication Data

US 2004/0109247 A1 Jun. 10, 2004

(51) Int. Cl.[7] .................... B60R 1/06; B60R 1/062; B60R 1/07; G02B 7/182; G05D 3/00
(52) U.S. Cl. ............... 359/843; 359/876; 359/877; 359/900; 701/49
(58) Field of Search ............... 701/49; 359/843, 359/877, 872, 873, 874, 876, 900

(56) References Cited

U.S. PATENT DOCUMENTS

| | | | |
|---|---|---|---|
| 4,223,257 A | 9/1980 | Miller | 318/594 |
| 4,679,158 A | 7/1987 | Tate | |
| 4,811,226 A | 3/1989 | Shinohara | |
| 4,834,522 A | 5/1989 | Janowicz | |
| 4,856,886 A | 8/1989 | Polzer et al. | |
| 4,971,430 A | 11/1990 | Lynas | |
| 5,064,274 A | 11/1991 | Alten | 359/604 |
| 5,080,492 A | 1/1992 | Platzer, Jr. | 359/877 |
| 5,132,851 A | 7/1992 | Bomar et al. | 359/843 |
| 5,668,675 A | 9/1997 | Fredricks | 359/838 |
| 5,706,144 A | 1/1998 | Brandin | 359/843 |
| 5,798,575 A | 8/1998 | O'Farrell et al. | 307/10.1 |
| 5,993,015 A | 11/1999 | Fredricks | 359/843 |
| 6,142,639 A | 11/2000 | Jain et al. | 359/603 |
| 6,154,328 A * | 11/2000 | Welsch et al. | 359/877 |
| 6,163,083 A | 12/2000 | Kramer et al. | 307/10.1 |
| 6,176,587 B1 | 1/2001 | Fredricks | 359/843 |

FOREIGN PATENT DOCUMENTS

| | | | |
|---|---|---|---|
| DE | 101 26 238 A1 | * | 1/2002 |
| JP | 60-092134 A | * | 5/1985 |
| JP | 62-031540 A | * | 2/1987 |
| JP | 02-106452 A | * | 4/1990 |
| JP | 02-234858 A | * | 9/1990 |
| JP | 08-142751 A | * | 6/1996 |
| WO | WO 00/29258 A1 | * | 5/2000 |

* cited by examiner

*Primary Examiner*—John Juba. Jr.
(74) *Attorney, Agent, or Firm*—Kathryn A. Marra

(57) ABSTRACT

An automobile exterior rearview mirror system in which adjustments by the vehicle operator to the driver side mirror are used to make automatic adjustments to the passenger side mirror without requiring the operator to make separate, independent adjustment of that mirror. The automatic adjustment is determined using the measured horizontal angle of the driver side mirror along with distance data related to the position of an inboard edge of each of the exterior mirrors.

18 Claims, 3 Drawing Sheets

EXTERIOR REARVIEW MIRROR SYSTEM

TECHNICAL FIELD

The present invention relates to automotive exterior rearview mirror systems that include adjustable driver and passenger side exterior mirrors.

BACKGROUND OF THE INVENTION

Passenger automobiles today commonly include outside rearview mirrors on both the driver and passenger side of the vehicle. These mirrors are typically adjustable both vertically (up/down) and horizontally (left/right), using electric motors controlled by the driver via a mirror position switch. Usually, a single switch assembly is used which includes a joystick type switch for directing the two-directional movement of the motors as well as a left/right selector switch that switches between the two exterior mirrors so that they can be adjusted one at a time, independently of each other. The selector switch may also include a locked position so that movement of the joystick does not activate either of the mirror motors. On vehicles provided with memory positioning, the mirrors can be automatically moved by suitable vehicle circuitry to a preset position established by the driver. Such circuitry can be implemented using position sensors on the mirrors to determine the instantaneous position of the mirrors in both the horizontal and vertical directions. These types of mirror positioning circuits are well known.

Normally, the driver and passenger side exterior mirrors are adjusted individually by the driver, as mentioned above. However, it has been proposed to provide automatic adjustment of the passenger side exterior mirror based on positioning of the driver side mirror. It is a general object of this invention to provide an exterior rearview mirror system of this type in which adjustments made by the driver to the driver side exterior mirror can be detected and used to automatically make similar adjustments to the passenger side exterior mirror so as to provide the desired field of view through the passenger side mirror without requiring independent adjustment of the passenger side mirror by the driver.

SUMMARY OF THE INVENTION

In accordance with the invention, there is provided a method and apparatus for adjusting an automobile exterior rearview mirror system in which adjustments by the vehicle operator to the driver side mirror are used to make automatic adjustments to the passenger side mirror without requiring the operator to make separate, independent adjustment of the passenger side mirror. The automatic adjustment is determined using the horizontal angle of the driver side mirror along with distance data related to the position of an inboard edge of each of the exterior mirrors. The distance data preferably comprises two pieces of data; namely, (1) the distance along the vehicle's lateral (side-to-side) axis between the driver position and the inboard edge of the driver side mirror, and (2) the distance along the lateral axis between the driver position and the inboard edge of the passenger side mirror. These values along with the horizontal angle of the driver side mirror can be used geometrically to determine the proper positioning of the passenger side mirror.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figures 1, 2:
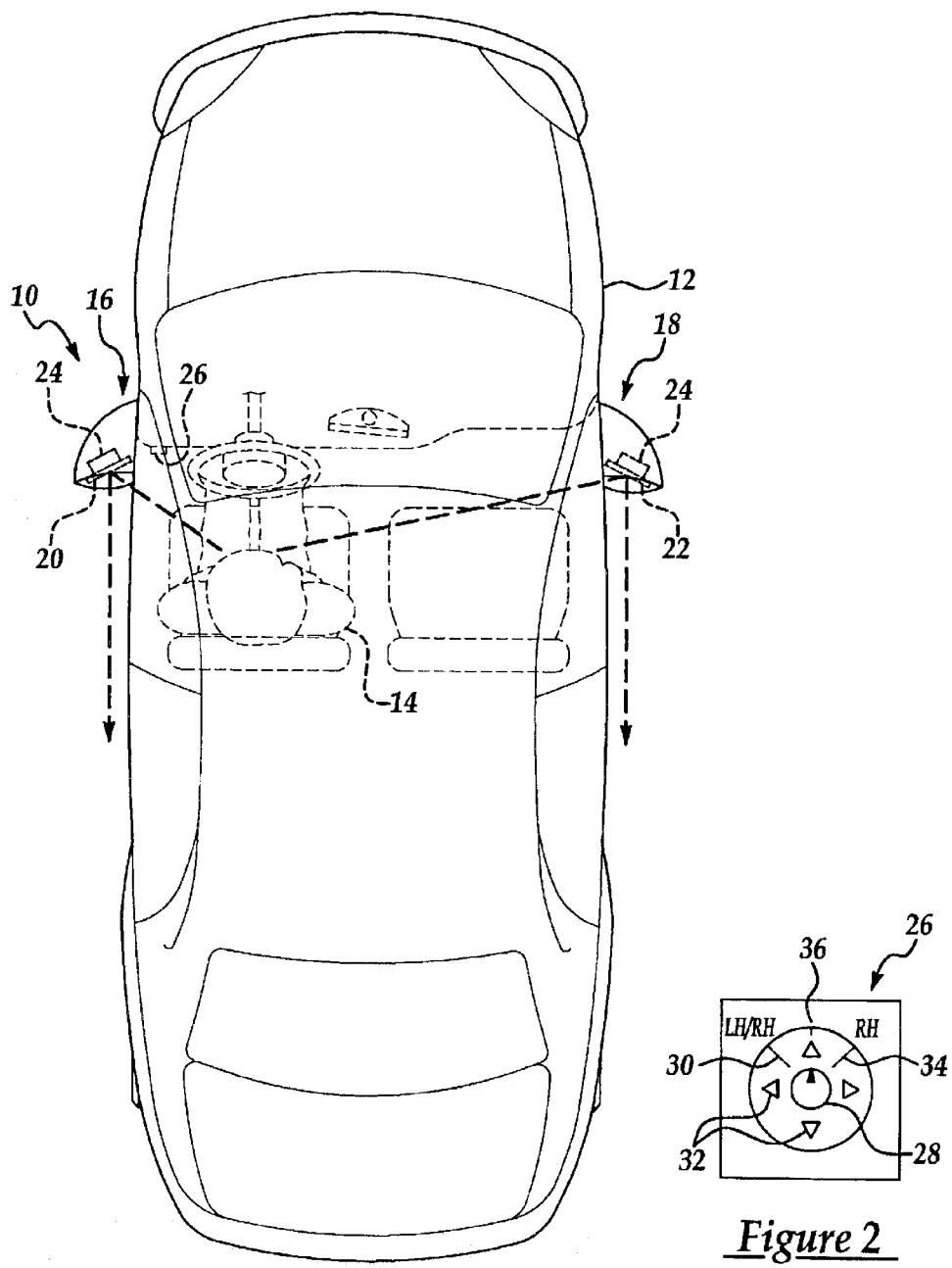
FIG. 1 is a plan view of a preferred embodiment of an automobile exterior rearview mirror system of the present invention.
FIG. 2 is a plan view of a control switch of the rearview mirror system of FIG. 1.

FIG. 1 illustrates an exterior rearview mirror system 10 implemented on a typical passenger vehicle 12. To assist an occupant driver 14 in obtaining an exterior view to the rear of the vehicle, the mirror system 10 includes a left-hand, LH, rearview mirror assembly 16 and a right-hand, RH, rearview mirror assembly 18, each disposed on a respective exterior side of the automobile 12. Each mirror assembly 16, 18 has a reflective element such as a mirror 20, 22 having an angular position that is adjustable by a pair of positioning motors 24—one for horizontal positioning and the other for vertical positioning. The motors 24 for each outside rearview assembly 16, 18 are operated from within the vehicle by an occupant driver 14 via a mirror position switch assembly 26.

As shown in FIG. 2, the mirror position switch assembly 26 has a short joystick-type actuation arm or lever 28 that is both displaceable through a small arc in four directions (up, down, left, and right) and rotatable about its central axis between three positions (identified as LH/RH, neutral, and RH). When the switch lever 28 is rotated to the LH/RH mode position 30, pivotal movement of the lever 28 to any of its four positions will cause a concomitant change in the position of the LH mirror 20, and the system will automatically adjust the RH mirror 22 as well. The four directional positions can be identified by arrows 32 imprinted on the switch 26. Rotation of the lever 28 to a RH mode position 34 will enable the driver to adjust the RH mirror 22 directly, without effecting the LH mirror 20. In addition, the toggle 28 can be rotated to the neutral or locked position 36 where pivotal movement of the switch lever 28 will be ignored by the system. The LH/RH mode position 30 is disposed approximately thirty to ninety degrees counter-clockwise from the locked position 36 and the RH mode position 34 is orientated clockwise from lock position 36 by the same thirty to ninety degree angle. The switch assembly 26 can be implemented as two separate switches: a four-way mirror position switch having four sets of contacts (one for each direction); and a three position mirror select switch for selecting between the two mirror adjustment modes (LH/RH mode or RH-only mode) or putting the system in a locked condition. Of course, a variety of other switch configurations can be used for the rearview mirror system 10 such as where, for example, the mirror select switch function is separated from the lever 28 and implemented using a rocker switch, slide switch, or other independent switch. A simpler joystick type switch can then be used for the directional control. Regardless of which of these switch configurations may be used, their design, construction, and implementation within the vehicle as a part of the mirror positioning control circuit is well known to those skilled in the art.

Figure 3:
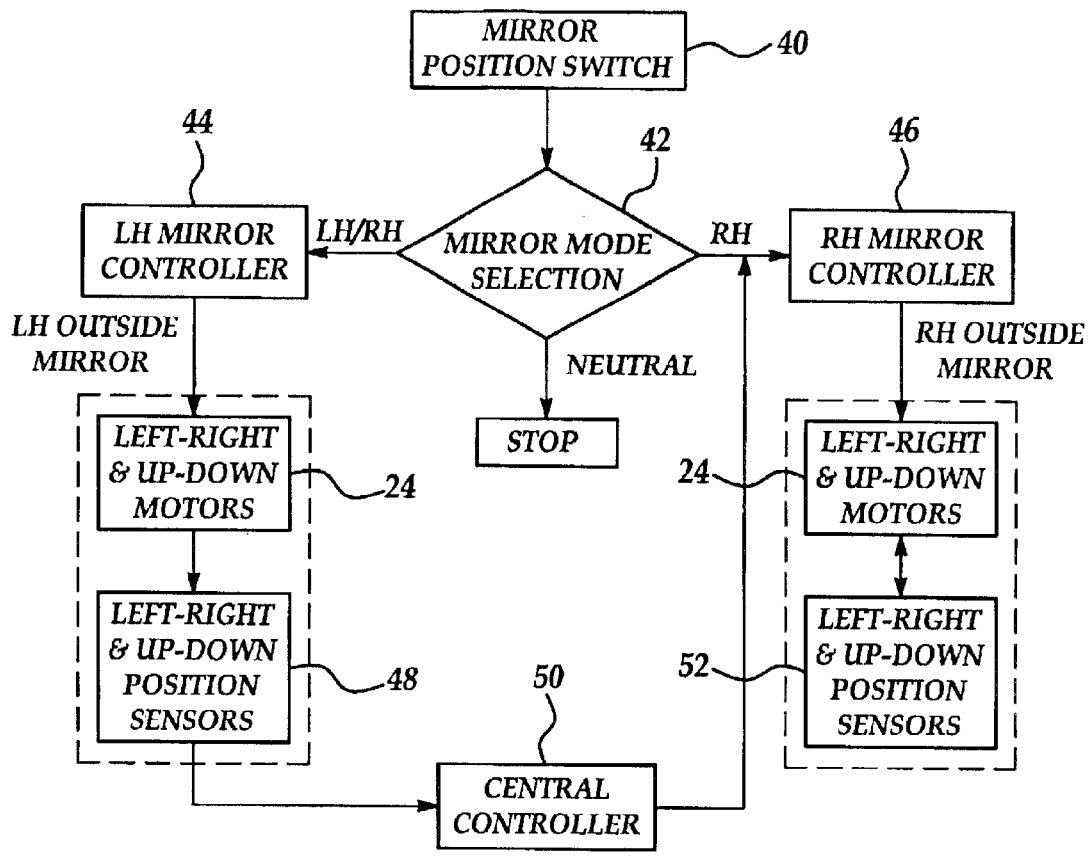
FIG. 3 is a flow chart of a method in operating the rearview mirror system of FIG. 1.

Referring to FIG. 3, a block diagram of the control logic for the rearview mirror system 10 is illustrated. The circuitry can be active at all times and signals from the mirror position switch 40 are routed by the mirror select switch 42 to either a LH mirror controller 44, a RH mirror controller 46, or are blocked in the event the select switch 42 is in its locked position. When the occupant driver 14 selects the LH/RH mode position 30 for mirror control, any mirror position input signals received from the mirror position switch 40 are used by the LH mirror controller 44 to control operation of the left hand mirror's horizontal (left-right) and vertical (up-down) positioning motors 24. From the driver's perspective, this adjustment of the left-hand mirror using the illustrated embodiment need not be any different than is done for conventional exterior rearview mirror systems. Furthermore, there are any of a number of well known circuit designs available for using the mirror position input signals to provide corresponding adjustments of the left hand mirror using the motors 24.

The instantaneous position of the LH mirror 20 is detected using position sensors 48 and is provided as a feedback position data to a central control circuit 50. Using this data, the central controller 50 calculates the necessary position output signals for the RH mirror 22. This output signal is sent to the RH controller 46 which then utilizes its associated motors 24 to properly position the mirror 22. RH mirror assembly 18 also includes a set of position sensors 52 which instantaneously monitor the angular positioning of mirror 22 and provide feedback used by the RH controller 46 to determine when the mirror is properly positioned. These position sensors 48, 52 and their use for feedback in positioning the mirrors 20, 22 can be implemented using known circuit designs employed in memory mirror systems of the type in which a desired position of the mirror for a particular driver is stored in memory and can be recalled to automatically reposition the mirror to that driver's preferred position. Memory mirror systems of this type can also be integrated with other cockpit devices such as electronic seat positioning and adjustable pedal systems. In this regard, the control circuit 50 can be a separate circuit from the LH and RH mirror controllers 44, 46 or can be integrated in with either one or both of these, its function in this embodiment primarily being to utilize the LH mirror feedback position data from the position sensors 48 to determine the automatic adjustments needed to the RH mirror 22 to position it in the desired orientation.

Where the driver 14 desires to set the position of the RH mirror individually using the mirror position switch 40, the mirror selector switch 42 can be rotated instead to the RH position 34, which when operated, communicates with the RH controller 46 to adjust only the RH mirror 22. This mode effectively bypasses the central controller 50 altogether and does not actuate or effect the LH mirror 20.

Having thus described the overall design and operation of the rearview mirror system 10, the process utilized by the central controller 50 to automatically adjust the RH mirror 22 based on driver adjustments to the LH mirror 20 will now be described in conjunction with FIGS. 4 and 5. As indicated above, mirror positioning occurs along two orthogonally related planes—a horizontal plane for left-right angular adjustments and a vertical plane for upwardly and downwardly angular adjustments. The positioning adjustments for each mirror 20, 22 involve rotating the mirror through a horizontal and/or vertical angle about a pivot point, and these centers of rotation for mirrors 20 and 22 are identified as Points P and Q, respectively, in FIG. 5. In the illustrated embodiment, the vertical angle of both mirrors 20, 22 are maintained the same and this typically is desired for a driver under normal conditions. Thus, with the mirror select switch 42 in the LH/RH position, vertical adjustments commanded by the driver for the left mirror are used to move both mirrors 20, 22 to result in the same angle.

Figure 4:
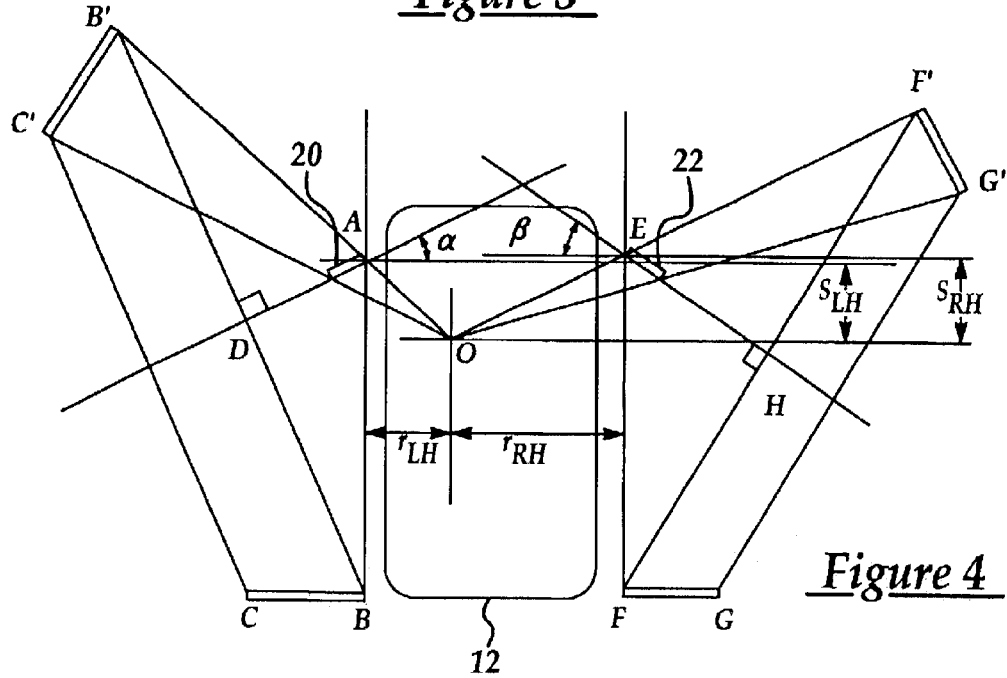
FIG. 4 is a diagrammatic view of the rearview mirror system of FIG. 1 showing some of the mirror geometry for both the right and left hand mirrors relative to the vehicle driver.
Figure 5:
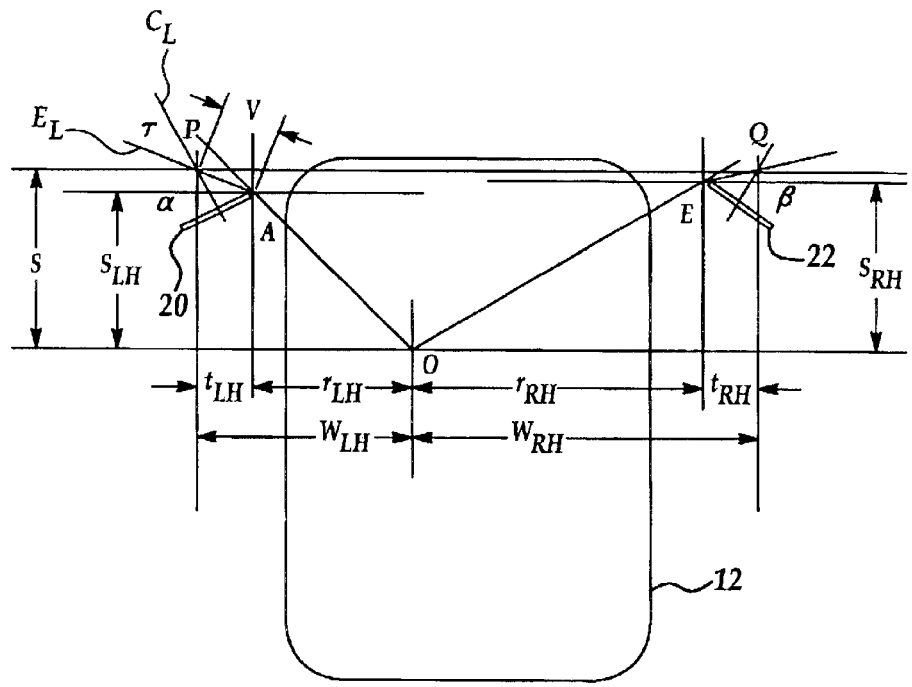
FIG. 5 is a diagrammatic view as in FIG. 4 showing further details of the angular and spatial geometry used as the basis for the right hand mirror positioning calculations used by the rearview mirror system of FIG. 1.

The relationship between the horizontal angular positions of the two mirrors is more complex and is shown in FIGS. 4 and 5. When applying these geometric relationships and making certain approximations, the central controller 50 can use an equation to calculate the desired RH mirror 22 horizontal angle β using only the measured LH mirror angle α and distance data concerning the position of an inboard edge (points A and E) of each of the two mirrors. The horizontal angle α is determined using the received feedback position data from the sensors 48. As will be understood from the discussion below, the distance data can be completely determined using only the measured LH mirror angle α along with predetermined data that is fixed for a particular vehicle model and can be preloaded by the manufacturer into the controller 50. In calculating the horizontal angle α, the relationship between the feedback position data and the associated horizontal angle can be provided in any desired form such as by an equation or as a look-up table. In this regard, determination of the horizontal angle need not involve any such conversion of the position data to a value measured in angular degrees, but rather the horizontal angle can be represented using any analog or digital value suitable for determining a passenger side mirror control signal that can be used along with the position sensors 52 to move the passenger side mirror to the proper corresponding position. Thus, in some embodiments, the directly measured data from the sensors 48 can be converted to a corresponding control signal for the passenger side mirror without transforming the measured data into an angular quantity.

As shown in FIG. 4, by applying the reflection principle of a mirror (i.e., $\overline{B'C'}$ is $\overline{BC}$'s image viewed by the driver 14 from point O if $\overline{AD}\perp\overline{BB'}$ and $\overline{AD}\perp\overline{CC'}$), the equations for the horizontal angle for both LH and RH mirrors 20, 22 are:

$$\alpha = \frac{1}{2}\tan^{-1}\left(\frac{r_{LH}}{s_{LH}}\right) \text{ and} \tag{1}$$

$$\beta = \frac{1}{2}\tan^{-1}\left(\frac{r_{RH}}{s_{RH}}\right) \tag{2}$$

where α and β are the horizontal angles of their respective mirrors 20, 22. Since $s_{LH} \approx s_{RH} \approx s$, replacing $s_{LH}$ and $s_{RH}$ with s and substituting equation (1) into equation (2), the horizontal angle of the mirror 22 for the RH assembly 18 can be approximated by the following equation where β is a function of α and the distances $r_{LH}$ and $r_{RH}$ along the vehicle's horizontal lateral (left-right) axis between the driver's position (Point O) and the inboard edges of both mirrors (Points A and E):

$$\beta = \frac{1}{2}\tan^{-1}\left(\frac{r_{RH}}{r_{LH}}\tan 2\alpha\right). \tag{3}$$

By inspection of FIG. 5, it can be seen that $r_{LH}$ and $r_{RH}$ vary depending upon the horizontally-rotated position of their respective mirror and that they can be determined based on the both the distance w between the driver's position O and the center of rotation P, Q of the mirror, and the distance t between the center of rotation P, Q and the inboard edge A, E of the mirror. Now, since $t_{LH} \approx t_{RH}$, equation (3) may be further modified to:

$$\beta = \frac{1}{2}\tan^{-1}\left(\frac{w_{RH} - t_{RH}}{w_{LH} - t_{LH}}\tan 2\alpha\right) \approx \frac{1}{2}\tan^{-1}\left(\frac{w_{RH} - t_{LH}}{w_{LH} - t_{LH}}\tan 2\alpha\right) \quad (4)$$

where $t_{LH} = v\sin(\alpha + \tau)$ and $v$ denotes the distance from the mirror rotation center P to the inboard edge A of mirror 20. The angle $\tau$ is the angle formed between (i) a centerline $C_L$ of the mirror and (ii) an edge line $E_L$ that intersects the inboard edge of the mirror 20 and meets the centerline $C_L$ at the center of rotation P. As will be appreciated, both $v$ and $\tau$ are mathematical constants that are fixed for a particular mirror assembly 16, as are the distances $w_{LH}$ and $w_{RH}$ for a particular vehicle design. Thus, equation (4) permits determination of the passenger side horizontal angle using only a single variable ($\alpha$), with the other terms of the equation all being constants that are predetermined for a particular mirror system and vehicle model.

Figure 6:
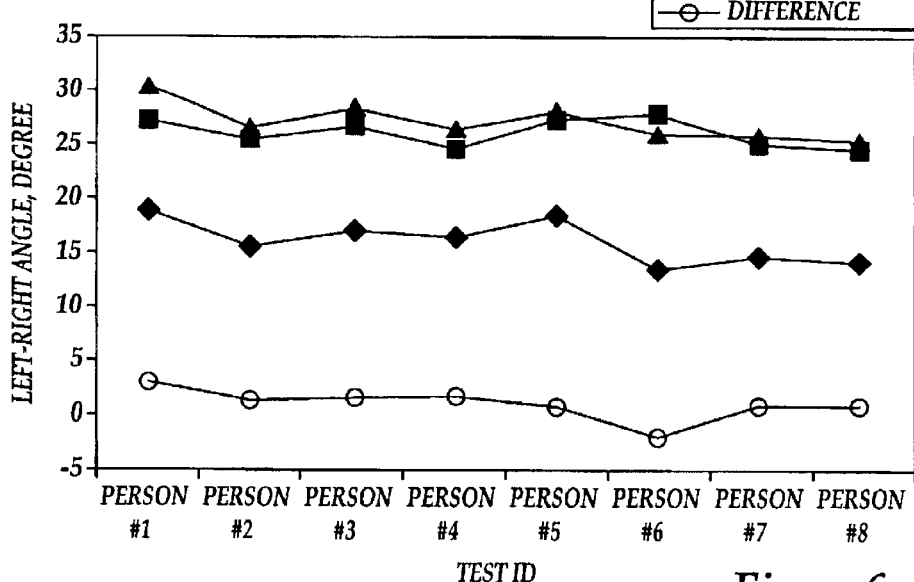
FIG. 6 is a graph comparing calculated angular positions for the right hand mirror versus user-selected positions for that mirror.

The validity of equation (4) has been mathematically and experimentally verified, as shown in FIG. 6. In this chart, the measured LH mirror angle is the horizontal angle $\alpha$ determined from the feedback position data. The measured RH mirror angle is the horizontal angle selected by the same driver using the RH mode of selector switch 42, and the calculated RH mirror angle is the horizontal angle $\beta$ determined according to equation (4). These tests results showed only small differences between the measured and calculated RH angles. These differences are not entirely due to the approximations made in the equations above, but also reflect a fact that the RH mirror positions were determined to not have always been placed by the driver at their best positions. In some instances they were placed at positions judged "good enough" by the driver.

Since the only variable needed by equation (4) above is the information from the position sensors, the rearview mirror system 10 can thus be easily implemented using conventional memory mirror systems of the type that permit the driver to store one or more desired mirror positions which can be recalled later for automatic repositioning of the mirrors to the preset positions. The design and construction of such systems are known and come equipped with the position sensors 48, 52 to provide the necessary mirror position data for the feedback/control of the memory functionality of the mirrors. The simultaneous control of the LH and RH mirror assemblies that is carried out by controller 50 can be realized by modifying the existing control algorithm of the memory control module used in these types of memory systems. These and other suitable circuit designs are well within the level of skill in the art.

It will thus be apparent that there has been provided in accordance with the present invention an automobile exterior rearview mirror system which achieves the aims and advantages specified herein. It will of course be understood that the foregoing description is of a preferred exemplary embodiment of the invention and that the invention is not limited to the specific embodiment shown. Various changes and modifications will become apparent to those skilled in the art. For example, the illustrated embodiment is directed to the use of the system on an automobile designed for driving on the right side of a public road and it will be appreciated that the system can be implemented for vehicles in which the driver and front passenger positions are switched from that shown in the drawings, in which case the driver side mirror is the RH mirror and the passenger side mirror is the LH mirror. Furthermore, the automatic mirror adjustment technique described herein can also be used to control other rearview mirrors and systems, including, for example, an interior rearview mirror, one or more video cameras, periscope devices, etc. All such variations and modifications are intended to come within the scope of the appended claims.

What is claimed is:

1. A method of adjusting an automobile rearview mirror system having both a driver side exterior mirror and a passenger side exterior mirror, comprising the steps of:
   receiving a mirror position input signal from a user-activated mirror position switch;
   adjusting the position of the driver side exterior mirror using the input signal;
   determining the horizontal angle of the adjusted driver side exterior mirror relative to a reference position;
   determining a desired angle for the passenger side exterior mirror using the horizontal angle and distance data related to the position of an inboard edge of each of the exterior mirrors, the distance data comprising first and second distance data, with the first distance data being indicative of the distance along a lateral axis of the automobile between a driver position and the inboard edge of the driver side exterior mirror and the second distance data being indicative of the distance along the lateral axis between the driver position and the inboard edge of the passenger side exterior mirror; and
   adjusting the position of the passenger side exterior mirror using the desired angle.

2. The method of claim 1, wherein the first distance is determined using the horizontal angle.

3. The method of claim 2, wherein the driver side exterior mirror is adjustable by pivoting it about a center of rotation, and wherein the first distance is determined using:
   (a) the distance along the lateral axis between the driver position and the center of rotation;
   (b) the horizontal angle;
   (c) a second angle formed between (i) a centerline of the driver side exterior mirror and (ii) an edge line that intersects the inboard edge of the driver side exterior mirror and meets the centerline at the center of rotation; and
   (d) the distance from the center of rotation to the inboard edge of the driver side exterior mirror.

4. The method of claim 3, wherein the passenger side exterior mirror is adjustable in two dimensions by pivoting it about a center of rotation, and wherein said step of determining a desired angle further comprises determining the desired angle using data related to the center of rotation of each of the exterior mirrors.

5. The method of claim 4, wherein the desired angle $\beta$ is determined according to the equation:

$$\beta = \frac{1}{2}\tan^{-1}\left(\frac{w_{RH} - t_{RH}}{w_{LH} - t_{LH}}\tan 2\alpha\right)$$

where:
$\alpha$ is the horizontal angle;
$w_{RH}$ is the distance along the lateral axis between the driver position and the center of rotation of the passenger side exterior mirror;
$w_{LH}$ is the distance along the lateral axis between the driver position and the center of rotation of the driver side exterior mirror;

$t_{RH}$ is the distance between the center of rotation of the passenger side exterior mirror and the inboard edge of the passenger side exterior mirror; and $t_{LH}$ is the distance between the center of rotation of the driver side exterior mirror and the inboard edge of the driver side exterior mirror.

6. The method of claim 5, wherein $t_{RH}$ is approximated using the value of $t_{LH}$, and wherein $t_{LH}$ is determined using the equation $t_{LH} = v\sin(\alpha+\tau)$, where:

τ is the second angle; and v is the distance from the center of rotation of the driver side exterior mirror to the inboard edge of the driver side exterior mirror.

7. The method of claim 4, wherein the desired angle β is approximated according to the equation:

$$\beta = \frac{1}{2}\tan^{-1}\left(\frac{w_{RH} - t_{LH}}{w_{LH} - t_{LH}}\tan 2\alpha\right)$$

where:

α is the horizontal angle;

$w_{RH}$ is the distance along the lateral axis between the driver position and the center of rotation of the passenger side exterior mirror;

$w_{LH}$ is the distance along the lateral axis between the driver position and the center of rotation of the passenger side exterior mirror; and $t_{LH}$ is the distance between the center of rotation of the driver side exterior mirror and the inboard edge of the driver side exterior mirror.

8. The method of claim 2, wherein the second distance is approximated using data related to both the driver side and passenger side exterior mirrors.

9. The method of claim 1, wherein the driver side and passenger side exterior mirrors are each adjustable in two dimensions by pivoting them about a center of rotation, and wherein said step of determining a desired angle further comprises determining the desired angle using data related to the center of rotation of each of the exterior mirrors.

10. The method of claim 1, further comprising the steps of determining a vertical angle of the adjusted driver side exterior mirror relative to a reference position, and adjusting the passenger side exterior mirror to the same vertical angle.

11. A method of adjusting an automobile rearview mirror system having both a driver side exterior mirror and a passenger side exterior mirror, comprising the steps of:

receiving a mirror position input signal from a user-activated mirror position switch;

adjusting the position of the driver side exterior mirror in accordance with the input signal using a driver side mirror controller;

obtaining feedback position data related to the position of the driver side exterior mirror using one or more position sensors;

generating a passenger side control signal using the feedback position data and distance data, the distance data comprising first and second distance data, with the first distance data being indicative of the distance along a lateral axis of the automobile between a driver position and an inboard edge of the driver side exterior mirror and the second distance data being indicative of the distance along the lateral axis between the driver position and an inboard edge of the passenger side exterior mirror;

supplying the control signal to a passenger side mirror controller; and adjusting the position of the passenger side exterior mirror in accordance with the control signal using the passenger side mirror controller.

12. The method of claim 11, wherein said generating step further comprises determining the horizontal angle of the driver side exterior mirror using the position data, calculating a desired angle for the passenger side exterior mirror using the horizontal angle, and generating the control signal using the desired angle.

13. The method of claim 11, wherein said generating step further comprises supplying the position data to a control circuit which produces the control signal using the following steps:

determining the horizontal angle of the adjusted driver side exterior mirror relative to a reference position; and determining a desired angle for the passenger side exterior mirror using the horizontal angle and distance data related to the position of an inboard edge of each of the exterior mirrors.

14. An automobile exterior rearview mirror system, comprising:

a first exterior mirror assembly having a driver side exterior mirror, at least one motor for adjusting the position of the driver side exterior mirror, and one or more position sensors for determining the orientation of the driver side exterior mirror;

a second exterior mirror assembly having a passenger side exterior mirror, at least one motor for adjusting the position of the passenger side exterior mirror, and one or more position sensors for determining the orientation of the passenger side exterior mirror;

a mirror position switch for adjusting the position of at least the driver side exterior mirror using its associated motor; and one or more control circuits electrically coupled to the motors an mirror position switch, the control circuit(s) being operable in response to adjustments of the driver side exterior mirror using the mirror position switch to generate a control signal that actuates the motor associated with the passenger side exterior mirror to make corresponding adjustments to the passenger side exterior mirror;

wherein the control circuit(s) is operable to generate the control signal using a mathematical relationship that utilizes position data from the first exterior mirror assembly position sensor(s) and distance data related to the position of an inboard edge of each of the exterior mirrors, the distance data comprising first and second distance data, with the first distance data being indicative of the distance along a lateral axis of the automobile between a driver position and the inboard edge of the driver side exterior mirror and the second distance data being indicative of the distance along the lateral axis between the driver position and the inboard edge of the passenger side exterior mirror.

15. The rearview mirror system set forth in claim 14, wherein the position data is used to determine the horizontal angle of the driver side exterior mirror relative to a reference position, and wherein the horizontal angle is used along with the distance data to generate the control signal.

16. The rearview mirror system set forth in claim 15, wherein the first distance is determined using the horizontal angle.

17. The rearview mirror system set forth in claim 14, wherein the control circuit(s) comprises a driver side mirror controller, a passenger side mirror controller, and a central controller, and wherein the control signal is generated by the central controller.

18. An automobile exterior rearview mirror system, comprising:
- a first exterior mirror assembly having a driver side exterior mirror, at least one motor for pivoting the driver side exterior mirror about a center of rotation, and one or more position sensors for determining the orientation of the driver side exterior mirror;
- a second exterior mirror assembly having a passenger side exterior mirror, at least one motor for pivoting the passenger side exterior mirror about a center of rotation, and one or more position sensors for determining the orientation of the passenger side exterior mirror;
- a mirror position switch for adjusting the position of at least the driver side exterior mirror using its associated motor; and
- one or more control circuits electrically coupled to the motors and mirror position switch, the control circuit(s) being operable in response to adjustments the driver side exterior mirror via the mirror position switch to generate a control signal that actuates the motor associated with the passenger side exterior mirror to make corresponding adjustments to the passenger side exterior mirror;
- wherein the control signal represents a desired angle β for the passenger side exterior mirror, with the control signal being generated using a horizontal angle α of the driver side exterior mirror that is determined using position data from the first exterior mirror assembly position sensor(s); and
- wherein the desired angle β is determined according to the equation:

$$\beta = \frac{1}{2}\tan^{-1}\left(\frac{w_{RH} - t_{RH}}{w_{LH} - t_{LH}}\tan 2\alpha\right)$$

where:
- $w_{RH}$ is the distance along a lateral axis between the driver position and the center of rotation of the passenger side exterior mirror;
- $w_{LH}$ is the distance along a lateral axis between the driver position and the center of rotation of the driver side exterior mirror;
- $t_{RH}$ is the distance between the center of rotation of the passenger side exterior mirror and an inboard edge of the passenger side exterior mirror; and
- $t_{LH}$ is the distance between the center of rotation of the driver side exterior mirror and an inboard edge of the driver side exterior mirror;
- and wherein $t_{RH}$ is approximated using the value of $t_{LH}$ with $t_{LH}$ being determined using the equation $t_{LH}=v\sin(\alpha+\tau)$, where:
- τ is a second angle formed between (i) a centerline of the driver side exterior mirror and (ii) an edge line that intersects the inboard edge of the driver side exterior mirror and meets the centerline at the center of rotation of the driver side exterior mirror; and
- τ is the distance from the center of rotation of the driver side exterior mirror to the inboard edge of the driver side exterior mirror.

* * * * *